United States Patent
Williams et al.

(10) Patent No.: US 7,297,368 B2
(45) Date of Patent: Nov. 20, 2007

(54) METHOD OF MAKING CARBON FIBER-CARBON MATRIX REINFORCED CERAMIC COMPOSITES

(75) Inventors: Brian Williams, Camarillo, CA (US); Robert Benander, Sylmar, CA (US)

(73) Assignee: Ultramet, Pacoima, CA (US)

( * ) Notice: Subject to any disclaimer, the term of this patent is extended or adjusted under 35 U.S.C. 154(b) by 146 days.

(21) Appl. No.: 10/824,746

(22) Filed: Apr. 15, 2004

(65) Prior Publication Data

US 2004/0207133 A1    Oct. 21, 2004

Related U.S. Application Data

(60) Provisional application No. 60/463,066, filed on Apr. 15, 2003.

(51) Int. Cl.
*C23C 16/26* (2006.01)
*C23C 16/32* (2006.01)

(52) U.S. Cl. .............................. 427/249.1; 427/249.2; 427/249.3; 427/249.4

(58) Field of Classification Search ............ 427/249.1, 427/249.2, 249.3, 249.4
See application file for complete search history.

(56) References Cited

U.S. PATENT DOCUMENTS

| | | | | |
|---|---|---|---|---|
| 4,889,686 | A * | 12/1989 | Singh et al. | 156/89.25 |
| 4,944,904 | A * | 7/1990 | Singh et al. | 427/399 |
| 5,254,397 | A | 10/1993 | Kawai et al. | |
| 5,283,109 | A | 2/1994 | Kaplan et al. | |
| 5,552,352 | A | 9/1996 | Brun et al. | |
| 5,705,008 | A * | 1/1998 | Hecht | 156/148 |
| 5,855,828 | A * | 1/1999 | Tuffias et al. | 264/29.1 |
| 5,952,100 | A * | 9/1999 | Corman et al. | 428/384 |
| 5,962,103 | A * | 10/1999 | Luthra et al. | 428/107 |
| 6,024,898 | A * | 2/2000 | Steibel et al. | 264/29.1 |
| 6,231,791 | B1 | 5/2001 | Heine et al. | |
| 6,235,379 | B1 | 5/2001 | Kameda et al. | |
| 6,365,257 | B1 * | 4/2002 | Hecht | 428/65.9 |
| 6,921,707 | B1 | 7/2005 | Zinn et al. | |

OTHER PUBLICATIONS

Babcock, Williams, Brockmeyer Rapid, Cost-Effective Fabrication of Fiber-Reinforced Ceramic Matrix Composites for High-Temperature Operating Environments, Power Point Presentation, Jan. 29, 2002.

* cited by examiner

*Primary Examiner*—Bret Chen
(74) *Attorney, Agent, or Firm*—Bruce A. Jagger

(57) ABSTRACT

A method of making a carbon fiber-carbon matrix reinforced ceramic composite wherein the result is a carbon fiber-carbon matrix reinforcement is embedded within a ceramic matrix. The ceramic matrix does not penetrate into the carbon fiber-carbon matrix reinforcement to any significant degree. The carbide matrix is a formed in situ solid carbide of at least one metal having a melting point above about 1850 degrees centigrade. At least when the composite is intended to operate between approximately 1500 and 2000 degrees centigrade for extended periods of time the solid carbide with the embedded reinforcement is formed first by reaction infiltration. Molten silicon is then diffused into the carbide. The molten silicon diffuses preferentially into the carbide matrix but not to any significant degree into the carbon-carbon reinforcement. Where the composite is intended to operate between approximately 2000 and 2700 degrees centigrade for extended periods of time such diffusion of molten silicon into the carbide is optional and generally preferred, but not essential.

13 Claims, 1 Drawing Sheet

METHOD OF MAKING CARBON FIBER-CARBON MATRIX REINFORCED CERAMIC COMPOSITES

RELATED APPLICATIONS

This application claims the benefit of U.S. Provisional Application Ser. No. 60/463,066, filed Apr. 15, 2003.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. NAS8-99093 awarded by NASA Marshall Space Flight Center (Huntsville, Ala.).

BACKGROUND OF THE INVENTION

1. Field of the Invention

The invention relates in general to carbon fiber-carbon matrix reinforced ceramic composites and the production of such composites.

2. Description of the Prior Art.

Carbon fiber reinforced carbon matrix composites have been widely used for high temperature applications, particularly in military and aerospace applications. Such carbon reinforced carbon matrix composites have not achieved universal acceptance for such applications because they suffer from certain inherent limitations. Reinforced ceramic matrix composites, such as, for example, silicon carbide reinforced ceramic matrix composites had previously been proposed for high temperature applications, but such composites also suffer from certain limitations, which restrict their general use.

Carbon fibers retain their strength at elevated temperatures, but in the presence of oxygen they oxidize rapidly at temperatures above about 900 degrees Fahrenheit. To be useful at elevated temperatures carbon fibers must be protected from oxidation. Materials that are capable of resisting destructive oxidation at ultra-high temperatures (above approximately 1500 degrees centigrade) are typically ceramics. Such ceramics are potentially useful as matrix materials in composites and they include, for example, zirconium and hafnium carbide, but they suffer from other problems that had previously appeared to disqualify them for general use. For example, although zirconium carbide oxidizes in the presence of oxygen at elevated temperatures, above about 1900 degrees centigrade the resulting zirconium oxide coating is dense and tightly adhered to the remaining body of zirconium carbide. Once a dense coating of zirconium oxide forms it protects the underling zirconium carbide matrix from further oxidation so long as the temperature remains above about 1900 degrees centigrade. Unfortunately, below about 1900 degrees centigrade zirconium oxide becomes a loosely adhered powder that falls off the substrate, thereby leaving the underling zirconium carbide exposed which in turn oxidizes and falls off. Oxidation rapidly consumes the entire body of zirconium carbide below about 1900 degrees centigrade. Between approximately 1900 and 2500 to 2700 degrees centigrade zirconium carbide provides a very satisfactory matrix for composites because of the tightly adhered oxide coating. Hafnium carbide likewise provides a satisfactory matrix for carbon fibers at high temperatures from about 1900 degrees centigrade up to at least approximately 2700 degrees centigrade, but fails rapidly below about 1900 degrees centigrade. Hafnium carbide is, however, much higher in density than zirconium carbide. This weight penalty (approximately 50 percent greater) makes hafnium carbide undesirable for many applications. Silicon carbide is a satisfactory matrix for carbon fibers only up to a temperature of approximately 1650 degrees centigrade. It fails rapidly above about this temperature. When an application for a composite requires prolonged operation in an oxidizing environment at temperatures between about 1650 and 1900 degrees centigrade, the results are generally not fully satisfactory because the available matrix materials tend to fail rapidly in this temperature region.

Molten silicon tends to diffuse very aggressively into other materials. When silicon encounters carbon fibers or carbon matrix materials in a carbon-carbon matrix composite, the silicon tends to rapidly diffuse into the carbon and convert it to silicon carbide. This limits the usefulness of silicon in composites where carbon fibers are present.

The melt infiltration method used here is a pressureless process in which a molten material wicks by way of capillary action into a fiber preform. As compared with high pressure composite forming processes, the costs of equipment and operation are much lower for this pressureless melt infiltration process. If reactants are present, the infiltrating molten material will react in situ with the reactants during the infiltration process (infiltration reaction). It had previously been proposed to infiltrate a tightly woven carbon fiber preform containing sacrificial carbon with molten silicon (melting point of about 1414 degrees centigrade) so as to form a dense matrix of silicon carbide. It was proposed to protect the carbon fibers from reacting with the molten elemental silicon by the presence of a dense oxide coating on the carbon fibers. See, for example, Brun et al. U.S. Pat. No. 5,552,352, which proposes coating individual carbon or silicon carbide fibers with two coats, first, a metal oxide coat, and, second, a carbide, nitride, silicide, diboride, or noble metal coating over the metal oxide. All of the fibers have both coatings, that is, the coatings are both applied at the fiber level. A silicon carbide matrix is formed by the melt infiltration of molten silicon. The function of the second layer is said to be the prevention of a reaction between the fibers and the molten silicon. The molten silicon infiltrates a porous preform and forms a matrix in contact with the outer coating on each of the fibers according to Brun et al. It does not diffuse into a pre-existing solid carbide matrix. The resulting composite according to Brun et al. is a fiber reinforced ceramic matrix. It is not a carbon-carbon composite as the reinforcement within a ceramic matrix. Kameda et al. U.S. Pat. No. 6,235,379 proposes a silicon carbide fiber reinforced silicon carbide matrix in which the silicon carbide fiber is coated and the amount of free silicon next to the bundles of fibers is minimized as compared with the rest of the silicon carbide matrix. The silicon carbide matrix would fail rapidly at temperatures above about 1650 degrees centigrade. Heine et al. U.S. Pat. No. 6,231,791 proposes that graphite fibers be coated with two layers of graphite, and embedded in a body of carbon which is then melt infiltrated with silicon and reacted to silicon carbide. It is proposed to limit the exposure of the fibers to silicon at the infiltration temperature so as to prevent them from being attacked by the molten silicon.

A low temperature chemical vapor deposition method for the formation of dense protective coatings of materials such as titanium dioxide, zirconium dioxide, hafnium dioxide, tantalum oxide, alumina, and the like on carbon fibers within a bundle of carbon is disclosed in Zinn et al. Ser. No. 09/979,929 filed Nov. 27, 2001, now U.S. Pat. No. 6,921, 707, and assigned to the same assignee as this application. Such protective oxide coatings are well suited to protecting the carbon fibers from reaction with molten materials in melt infiltration operations.

Various proposals had been made for producing fiber reinforced ceramic composites. See, for example, Kawai et al U.S. Pat. No. 5,254,397, which proposes that the exterior of a substrate composed of a ceramic or carbon matrix reinforced with carbon fibers should be coated with a graded coating layer. The proposed graded layer would grade from silicon carbide on the exterior to the composition of the ceramic matrix on the inside. This graded layer is on the composite, not the individual fibers. The proposed silicon carbide faced composite would likely fail above about 1650 degrees centigrade. The silicon is not melt diffused into the composite so there is little risk that it will attack the carbon fibers during formation of the composite. Kaplan et al. U.S. Pat. No. 5,283,109 discloses the deposition of alternate thin layers of silicon carbide and zirconium or hafnium carbide on a carbon-carbon substrate to protect it up to about 3500 degrees Fahrenheit (about 1925 degrees centigrade).

The performance of many operations such as, for example, high temperature combustion chambers could be significantly improved if they could operate at temperatures of between room temperature and approximately 2500 to 2700 degrees centigrade, and particularly if this could be accomplished with lightweight materials. Being able to operate at any temperature over the full temperature range from room up to ultra-high temperatures with relatively inexpensive structures would greatly expand the flexibility of use and the potential markets for many structures, including, for example, the hot sections of commercial jet engines, reactors, furnaces, and the like. Those skilled in the art have recognized the need for a carbon fiber reinforced composite that will retain its useful characteristics over a wide range of operating temperatures, and particularly from approximately 1000 to 2700 degrees centigrade.

These and other difficulties of the prior art have been overcome according to the present invention.

BRIEF SUMMARY OF THE INVENTION

A preferred embodiment of the carbon fiber-carbon matrix reinforced ceramic composite according to the present invention comprises a carbon fiber-carbon matrix composite reinforcement embedded within a ceramic matrix, and a method for producing such a reinforced ceramic composite. The ceramic matrix does not penetrate into the carbon fiber-carbon matrix composite reinforcement to any significant degree. The carbide matrix is a solid carbide of at least one metal having a melting point above about 1850 degrees centigrade. At least when the composite is intended to operate between approximately 1500 and 2000 degrees centigrade for extended periods of time the solid carbide with the embedded reinforcement is formed first. Molten silicon is then diffused into the carbide. The molten silicon diffuses preferentially into the carbide matrix but not to any significant degree into the reinforcement. Where the composite is intended to operate between approximately 2000 and 2700 degrees centigrade for extended periods of time such diffusion of molten silicon into the carbide is optional but not essential.

The carbon fiber-carbon matrix composite reinforcement comprises bundles of carbon fibers, for example, tows, in a carbon matrix. The individual fibers in each bundle are preferably coated to protect them from oxidation and or to permit them to slip relative to the carbon matrix. Typical coatings include carbides, nitrides, carbon, metallic oxides, and the like.

The ceramic matrix generally comprises a metallic carbide composition. The metal carbide composition is tailored to the particular end use to which the reinforced ceramic composite is to be put. Typically, the metal carbide composition does not have a uniform composition throughout. The embedded carbon fiber-carbon matrix composite reinforcements are preferably surrounded by metallic carbide layers or sheaths in which the ratio of metal to carbon is either carbon rich or near stoichiometric. The spaces between the reinforcement sheaths can be metal rich, silicon rich, or have about the same composition as the sheaths. Preferably, the carbide regions between the sheaths are metal rich so as to provide a more ductile and crack free ceramic. It has been found that the metal carbide layers or sheaths around the reinforcements protect them from attack by molten silicon. These sheaths are formed before the composite is exposed to molten silicon. Even though molten silicon is very aggressive in diffusing into carbon and in converting carbon to silicon carbide, it has been found that the preformed stoichiometric or carbon rich carbide sheaths adequately protect the carbon-carbon composite reinforcement from attack by the molten silicon.

The reinforced ceramic composites are made by first forming a plurality of bundles of carbon fibers into a preform. The carbon bundles within the preform are generally from approximately 65 to 75 percent dense. That is, the void space within a bundle is from approximately 25 to 35 percent of the total volume of the bundle. At this stage, the spaces between the bundles in the preform are entirely void. Carbon is infiltrated into the preform using conventional carbon infiltration techniques such as chemical vapor deposition or infiltration, or resin infiltration and pyrolysis, or the like. After carbon infiltration the bundles are generally approximately 85 to 95 percent dense. The infiltrated carbon generally forms a dense coating around the bundles leaving void spaces between the bundles. These void spaces are generally reticulated, that is, they are interconnected and open to the outside of the preform. This permits infiltration by molten metals. The infiltrated carbon is both within the bundles where it forms a carbon matrix for the fibers, and between the bundles. The carbon between the bundles is sacrificial carbon, which will react with molten infiltrants to form a metal carbide matrix. The carbide matrix is formed by infiltrating the preform with molten metal and allowing the metal to react preferentially with the sacrificial carbon between the fiber bundles and not with the carbon within the bundles.

During use at high temperatures oxides form on the exterior of the composite. When silicon is present a silicon-oxygen-metal glass forms. Where, for example, the metal carbide includes zirconium carbide, the glass is composed of silicon-zirconium-oxygen.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of carbon fiber-carbon matrix reinforced ceramic composites. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation.

DETAILED DESCRIPTION OF THE PREFERRED EMBODIMENTS

Figure 1:
FIG. 1 is an enlarged view (220 times) of a cross-section of a carbon fiber-carbon matrix reinforced ceramic matrix composite of the invention showing dark carbon fiber-carbon matrix composite reinforcements surrounded by sheaths of near stoichiometric zirconium carbide with a zirconium rich ceramic matrix extending between the sheaths.

A preferred composite according to the present invention comprises a plurality of fiber bundles in the form of carbon fiber tows braided into a generally cylindrical combustion chamber preform having a length of about 8 inches, an inside diameter of about 2.5 inches, and an outside diameter of about 2.85 inches. Each of the tows contained from approximately 2000 to 3000 individual carbon fibers (or filaments) with an average diameter of about 10 microns.

The preform was subjected to a low temperature chemical vapor deposition process to form a dense continuous interface coating of zirconium oxide on each individual fiber. A standard vertically mounted quartz glass chemical vapor deposition reactor (8 inch outside diameter, 4 feet long with a wall thickness of about 2 millimeters) was equipped with a chlorination container loaded with 400 grams of zirconium metal turnings, and two ¼ inch stainless steel feed gas inlet tubes, one for oxygen and one for zirconium chloride. Chlorine gas was fed directly into the chlorination container at a rate of about 45 cubic centimeters per minute. The chlorination was carried out at about 500 degrees Centigrade. The resultant flow of zirconium chloride was fed directly to the reactor. Pure oxygen was fed into the reactor directly above the to be coated preform. The chemical vapor deposition reactor was kept at a pressure of less than about 5 torr. The zirconium chloride and the oxygen gas made first contact in the area approximately 1 inch below the inlet tubes. The preform was suspended so that the top of the preform was located about 3 inches below the gas inlets. The preform was illuminated using a low pressure mercury lamp to generate ultraviolet radiation. The mercury lamp generated a broad spectrum of light having wavelengths ranging from 250 to 600 nanometers at about 100 Watts per inch. Two lamps were used, one on each side of the reactor. The ultraviolet light caused molecular activation of the reactants. The reactants were shielded from exposure to ultraviolet light until they were mixed in the region about an inch above the preform. The reaction chamber was held at a temperature of approximately 350 degrees centigrade, well below the temperature at which the carbon oxidizes. The reactants were so reactive that it was necessary to dilute them by using very low pressure in the chamber. The reactions to produce the zirconium oxide took place instantly. A substantially uniform coating of zirconium oxide was achieved on the fibers throughout the entire preform with a processing time of about 10 to 15 hours. The tightly adhered coating was about 0.1 microns thick, and consisted of nano-crystals, very uniformly distributed throughout the preform on each individual filament.

The preform in which the fibers were coated with zirconium oxide was infiltrated with carbon using conventional chemical vapor deposition procedures so that there was a carbon matrix within the fiber bundles and a sacrificial carbon deposit between the fiber bundles. The bundles at this stage were in the nature of carbon fiber-carbon matrix composites. The sacrificial carbon between the bundles formed dense coatings around the bundles. There was open void space (void volume) between the fiber bundles. The carbon within the fiber bundles largely remained as a carbon matrix in which the fibers were embedded. At this stage, the work piece was in the form of an open porous carbon-fiber-carbon matrix preform. Most of the void volume was in the regions between the bundles. The sacrificial carbon between the void spaces was next converted to zirconium carbide through reactive melt infiltration with zirconium metal. The open void space allowed the metal infiltrant to penetrate the preform.

The work piece preform was placed in a furnace under an inert argon atmosphere plus hydrogen, multiple pieces of zirconium were placed on top of the work piece, and the temperature was raised to about 1950 degrees centigrade (about 100 degrees above the melting point of the zirconium metal). The work piece was held at this temperature for about 10 minutes and then allowed to cool. The volume of the zirconium metal was approximately 115 percent of the void volume in the work piece. The dense sacrificial carbon immediately surrounding the bundles was converted to about stoichiometric zirconium carbide. The void spaces between the bundles were filled with zirconium rich zirconium carbide. The work piece was about 95 percent dense and there was little interconnected porosity. Next, molten silicon was diffused into the work piece.

The work piece preform was again placed in a furnace under an inert argon atmosphere, pieces of silicon were placed on top of the work piece, and the temperature was raised to about 1500 degrees centigrade (about 85 degrees above the melting point of the silicon metal). The work piece was held at this temperature for about 10 minutes and then allowed to cool. The volume of silicon used was equal to approximately 12 volume percent of the entire volume of the preform. The entire amount of silicon diffused into the preform.

When tested in an oxidizing environment at about 1800 degrees centigrade, the finished composite quickly forms a Si—Zr—O glass coating on the outside, which protects the composite from further attack. A comparable composite but without the interdiffused silicon quickly suffers catastrophic failure due to destructive oxidation when tested under the same conditions.

Infiltrants that are suitable for use according to the present invention include those non-radioactive carbide forming metals with melting points above about 1850 degrees centigrade. Naturally occurring metals in this group include, for example, vanadium, chromium, zirconium, niobium, molybdenum, hafnium, tantalum, tungsten, iridium, mixtures and alloys thereof, and the like. The preferred infiltrants are the Group IV metals with melting points above 1850 degrees centigrade. These are zirconium and hafnium. The density of zirconium carbide is only about half that of hafnium carbide, so zirconium is preferred where weight is a consideration. With its higher melting point hafnium carbide is preferred where the composite will encounter ultra-high operating temperatures. In a low- or non-oxidizing environment, the 3900 degree centigrade melting point of hafnium carbide has a clear advantage over zirconium carbide, which melts at 3400 degrees centigrade. In an oxidizing environment, the 2774 degrees centigrade melting point of hafnium oxide offers a modest improvement over the 2677 degrees centigrade melting point of zirconiumj oxide. Mixtures of infiltrant materials can be employed if desired.

The carbon fiber bundles that are suitable for use include, for example, those containing from tens to thousands of fibers (typically from about 1000 to 12000 fibers per bundle). Typically, the individual fibers are from approximately 5 to 200 microns in diameter. One suitable carbon fiber is Thornel brand T-300 Pan-Based Fiber fabricated by Cytec, Greenville, S.C. This fiber is 92 percent carbon in tow form with an average diameter of about 7 microns.

The fibers can be of any length so long as they function in a carbon matrix infiltrated bundle to reinforce the ceramic composite. The bundles are typically from approximately 65 to 75 volume percent dense when they are first formed into preforms. That is, the void space that will be occupied by the carbon matrix is generally from approximately 25 to 35 volume percent of the entire bundle.

The interface coating on the individual fibers serves several purposes. It provides a weak bond to the carbon matrix so that the fibers can slip relative to the carbon matrix. It protects the fibers during the melt infiltration step from reacting with the infiltrant. The interface coating also protects the fibers from oxidation during use. Where the interface coating is an oxide, generally the only fully satisfactory way of forming the oxide coating without damaging the carbon fiber during the process is through the use of low temperature ultraviolet chemical vapor deposition. At elevated temperatures (at or above about 450 degrees centigrade) the reactive species in the chemical vapor deposition process attack and weaken the fibers to an unacceptable degree. Where the interface coating is carbon, it is preferably pyrolitic carbon. Pyrolitic carbon does not readily bond to itself once it has been exposed to air. If the fibers are first coated with pyrolitic carbon and then exposed to air before the carbon that forms the matrix is deposited, the fibers are free to slip relative to the matrix. Various carbide, boride and nitride coatings can be applied to the fibers, if desired. More than one interface coating can be applied if desired. Suitable metal oxide coatings include, for example, zirconium oxide, titanium oxide, hafnium oxide, tantalum oxide, aluminum oxide, and the like. The interface coatings generally range in thickness from approximately 0.01 to 1, and preferably from about 0.1 to 0.5, microns. Typical weight gain following application of the oxide interface coating is 2-8 percent of the original preform weight.

Preforms are prepared based on the desired configuration of the finished composite. The processing according to the present invention is such that the configuration of the preform can be maintained throughout so it is possible to make finished composites in near net shapes. Preforms can be made in substantially any desired shape and to preforms with non-uniform sections. The interface coating, particularly low temperature ultraviolet chemical vapor deposition applied oxides, can be applied to substantially any shape and to sections that are up to an inch or more thick. The carbon infiltration steps are likewise very tolerant of shape, size, and thickness variations. The melt infiltration proceeds by capillary action and gravity (when the infiltrant is placed above the preform) so this step is likewise very tolerant of shape, size, and thickness variations in the preform. This greatly expands the possible applications for composites made according to the present invention, and reduces the need for extensive, expensive, and difficult machining operations on the completed composite. For example, a braided preform combustion chamber was prepared. This preform had a wall thickness of about 0.125 inches. The fiber volume in the braid was about 35 percent. Due to reproducible expansion of the perform during processing, the wall thickness of the end parts tended to be approximately 0.160 inches, which drops the fiber volume to approximately 25 volume percent in the finished composite part.

The initial metal infiltrant reacts with the sacrificial carbon around the fiber bundles to form a solid carbide matrix between the fiber bundles. The high melting point metals, mixtures, and alloys that are useful for this purpose, and particularly zirconium and hafnium apparently do not infiltrate or diffuse to any significant degree into the carbon fiber-carbon matrix composites that make up the reinforcements in the ceramic matrix. Silicon, by contrast, very aggressively diffuses directly into the solid carbide matrix and readily infiltrates into any open voids in the ceramic matrix. The amount of metal that is required to form a particular metal carbide matrix is generally determined by reference to the void volume of the carbon impregnated preform. Where the metal is placed above the preform and flows down into it, the amount of metal provided is preferably no more than approximately 15 to 25 volume percent more than the void volume in the preform. This is economical of valuable refractory metals and it permits control over the amount of metal in the preform. The metal appears to distribute itself substantially throughout the preform. Within the preform the metal appears to react substantially stoichiometrically with the sacrificial carbon in the regions immediately adjacent to the fiber bundles. In the voids between the bundles of fiber the metal tends to form carbides that are metal rich. The presence of excess metal in what was previously void space does not appear to significantly limit the maximum temperature at which the composite can be used. For example, zirconium carbide matrix composites with zirconium rich regions have been successfully used at temperatures of nearly 2400 degrees centigrade, well above the 1855 degree melting point of zirconium. Such excess metal lends ductility and gas imperviousness to the composite. The volume of Zr introduced into the perform is typically 40-60 percent of the perform volume. The part is contained within an inductively heater graphite furnace (6-8 inches in diameter by 12 inches long), which is contained within a quartz vacuum chamber (10-12 inches in diameter by 4 feet long) with a pressure of less than about 5 torr, under 500 cubic centimeters per minute of argon and 1000 cubic centimeters per minute of of hydrogen during heatup. Heat up typically requires 30-200 min. Typically the maximum temperature is about 25 to 100 degrees centigrade above the melting point of the infiltrant metal. The system is held at this temperature for about 10 to 20 minutes. Typically it requires about 5 hours to reach a temperature below 200 degrees centigrade. During cool down the preform is kept under a blanket of argon at as flow rate of about 1000 cubic centimeters per minute of argon alone.

Molten silicon readily diffuses into a solid carbide matrix. It has been found that this diffusion can be enhanced if the carbide at the surface of the work piece is first lightly ground to remove a few thousandths of an inch (less than about 0.010 inches). The presence of a near stoichiometric layer or sheath of metal carbide around the bundles of fiber has been found to substantially inhibit the diffusion of the molten silicon into the fiber bundles. The volume percent of silicon in the ceramic matrix between the carbon fiber-carbon matrix composite reinforcement depends on the application, but is generally less than 50, and preferable from about 1 to 20 volume percent. After silicon infiltration the preform work piece typically exhibits from about 1 to 5 volume percent porosity. A greater concentration of silicon appears to exist at the infiltrated surface than in the center of the wall thickness. It appears that the carbon fiber-carbon matrix composite reinforcement in such a matrix promotes greater strength for a given fiber volume relative to conventionally carbon fiber-silicon carbide composites.

The carbon infiltrant that forms the carbon matrix within the bundles and the sacrificial carbon between the bundles is deposited using conventional procedures, typically, chemical vapor infiltration or resin infiltration and carbonization. After carbon infiltration the infiltrated carbon fiber bundles are typically from about 85 to 95 or more volume percent dense. That is the void space within the carbon matrix within the bundles is generally from about 15 to 5 or less volume percent of the entire bundle. The void volume within this carbon matrix is generally essentially closed so that there are no significant interconnected channels for the subsequent melt infiltrants to enter through. The carbon infiltration is preferably performed while the preform is supported to maintain shape. Typically, the preform is infiltrated within an inductively heater graphite furnace (6-8 inch diameter by 12 inches long), which is contained within a quartz vacuum chamber (10-12 inches in diameter by 4 feet long) under approximately 4 torr pressure. The preform is at a temperature of approximately 1100 degrees centigrade, and 3000 cubic centimeters per minute of hydrogen, and 2500 cubic centimeters per minute of methane. The carbon infiltration takes about 5 hours to complete.

Within the finished carbon fiber-carbon matrix reinforced ceramic composite the fiber volume ranges from approximately 20 to 50 volume percent of the entire composite. The uncombined carbon (generally in the form of a pyrolitic carbon matrix within the fiber bundles) generally ranges from about 10 to 25 volume percent. The metal, including silicon, in the completed composite (whether free or combined in a carbide) generally ranges from about 30 to 60 volume percent. Generally, where complete conversion of the metal to carbide is desired, it is preferred to provide approximately a 10 to 20 percent excess of carbon over the stoichiometric amount required to react with the metal infiltrant. Stoichiometric zirconium carbide, for example, is about 78 volume percent zirconium and 12 volume percent carbon.

Figure 2:
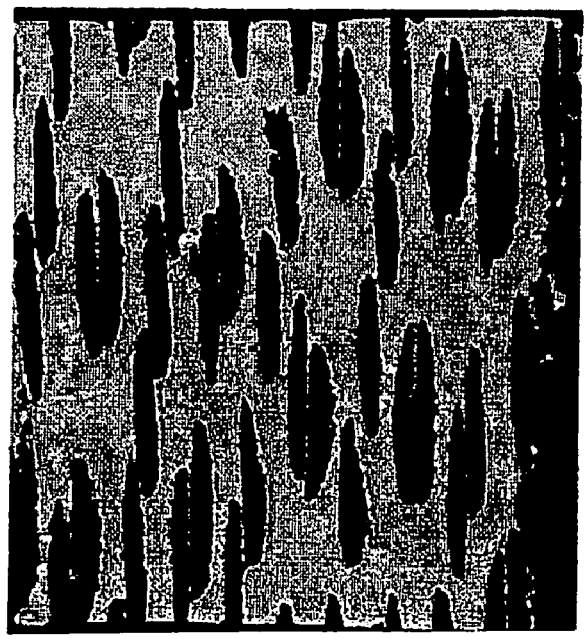
FIG. 2 is an enlarged view (30 times) of a cross-section of the same carbon fiber-carbon matrix reinforced ceramic matrix composite shown in FIG. 1.

The nature of the finished composite is apparent from FIGS. 1 and 2. A preform was braided from 7 micron diameter carbon fibers in tows of about 3000 fibers each, coated with zirconium dioxide in a low temperature ultraviolet chemical vapor deposition process, infiltrated with pyrolitic carbon using chemical vapor infiltration techniques to where there was less than about 5 volume percent void space within the tows, and infiltrated with about 15 volume percent excess molten zirconium to where there was less than about 5 volume percent void space within the entire composite. The resulting ceramic carbide had about 25 volume percent of carbon fibers. The resulting carbon fiber-carbon matrix composite reinforced ceramic carbide composite was sectioned and photographed. Copies of the resulting photographs appear as FIGS. 1 and 2. The black elongated regions are carbon fiber-carbon matrix composite reinforcements. The dark sheaths around the carbon fiber-carbon matrix composite reinforcements are near stoichiometric zirconium carbide, as are the darker spots in the matrix between the carbon fiber-carbon matrix composite reinforcements. These are the areas occupied by a dense coating of pyrolitic carbon that encapsulated the fiber tows during the carbon infiltration step. The lighter colored regions between the encapsulating sheaths of zirconium carbide are zirconium rich zirconium carbide and zirconium metal. The lighter colored regions mark where the void space was at the time the zirconium infiltration step was commenced. The dense zirconium carbide sheaths show signs of microcracking, but the cracks do not extend into the more metal rich ceramic regions. The use of metal rich composite is preferred because of its increased toughness and reduced gas permeability as compared with stoichiometric carbide. Because the carbon fiber-carbon matrix composite reinforcements retain their character the thusly reinforced ceramic composite is able to operate at much higher temperatures than would be the case if the carbon fiber-carbon matrix composite reinforcements were to be converted to silicon carbide. A second substantially similar composite was prepared. Approximately 0.005 to 0.010 inches of the composite were removed from its surface by grinding. The composite was heated in a furnace and contacted with molten silicon. Substantially all of the molten silicon diffused into the solid zirconium carbide ceramic leaving a silicon rich deposit on the surface of the composite. The silicon did not attack the carbon fiber-carbon matrix composite reinforcements to any significant degree, but it was distributed throughout the metal rich and stoichiometric regions of the ceramic carbide matrix. Substantially similar results are achieved by substituting hafnium for some or all of the zirconium.

When the finished composite is intended to operate for extended periods below about 1900 degrees centigrade, preferably the ceramic matrix is rich in silicon carbide. One way of providing silicon carbide content is to provide only enough high temperature metal to convert the sheaths around the fiber bundles to metal carbide. This leaves free carbon and open void space within the work piece. This work piece is infiltrated with additional carbon before being contacted with molten silicon. Where the finished composite is to be used below 1900 degrees centigrade in an oxidizing environment the volume ratio of silicon to high temperature metal is preferably greater than 1 to 1, and for operating temperatures above 1900 degrees centigrade the ratio is preferably less than 1 to 1. The volume ratio of silicon carbide to metal carbide can range from as little as 1 to 4 or 5 or more to as little as 4 or 5 to 1 or less. Sufficient metal carbide should be present to protect the fiber bundles from attack by the molten silicon, and sufficient silicon carbide should be present to assure the formation of a glass composed of silicon, metal, and oxygen when the composite is exposed to high temperature oxidizing environments. Less carbon is added in the initial infiltration step, typically just enough to allow for the formation of less than 50, and preferably from about 1 to 25 volume percent metal rich or stoichiometric zirconium carbide in the matrix between the carbon-carbon reinforcement. In the second carbon infiltration step sufficient carbon is added to promote the formation of a greater than 50, and preferably 75-99 volume percent of silicon carbide in stoichiometric or metal-rich condition in the matrix between the carbon-carbon reinforcement. Silicon infiltrates the remaining void space and diffuses into the existing zirconium carbide matrix material. The finished compact typically contains about 1 to 5 volume percent porosity, and a greater concentration of silicon exists at the infiltrated surface than in the center of the wall thickness.

What have been described are preferred embodiments in which modifications and changes may be made without departing from the spirit and scope of the accompanying claims. Clearly, many modifications and variations of the present invention are possible in light of the above teachings. It is therefore to be understood that, within the scope of the appended claims, the invention may be practiced otherwise than as specifically described.

What is claimed is:

1. A method of making a carbon fiber-carbon matrix reinforced ceramic composite, said method comprising:
   selecting a plurality of carbon fiber bundles, each of said carbon fiber bundles including a plurality of individual carbon fibers;
   forming a preform from said plurality of carbon fiber bundles;
   forming a deposit of carbon within said carbon fiber bundles and between said plurality of carbon fiber bundles, said deposits of carbon being formed by chemical vapor deposition;
   recovering a resultant open porous carbon fiber-carbon matrix preform from said forming wherein said carbon fiber bundles comprise carbon fiber-carbon matrix composite reinforcements, and said open porous carbon fiber-carbon matrix preform comprises a plurality of said carbon fiber-carbon matrix composite reinforcements embedded within a matrix of sacrificial carbon, said matrix of sacrificial carbon generally forming a dense coating around said carbon fiber-carbon matrix composite reinforcements and having voids therein between said carbon fiber-carbon matrix composite reinforcements;
   placing said open porous carbon fiber-carbon matrix preform in contact with a molten infiltrant, said molten infiltrant having a melting point above about 1850 degrees centigrade and being capable of reacting with carbon to form a carbide;
   letting said molten infiltrant infiltrate said porous carbon fiber-carbon matrix preform without the application of pressure;
   allowing said matrix of sacrificial carbon to react with said molten infiltrant to form a metal carbide matrix, said allowing including providing an amount of said molten infiltrant that is sufficient to permit said molten infiltrant to react preferentially with said matrix of sacrificial carbon and substantially not with said carbon fiber-carbon matrix composite reinforcements; and
   recovering said carbon fiber-carbon matrix reinforced ceramic composite from said allowing.

2. A method of claim 1 wherein said selecting includes selecting carbon fiber bundles wherein substantially each of said individual carbon fibers has a substantially continuous coating of a metallic oxide or carbide thereon.

3. A method of claim 2 wherein said selecting includes selecting carbon fiber bundles wherein substantially each of said individual carbon fibers has a substantially continuous coating of a metallic carbide thereon.

4. A method of claim 1 wherein said selecting includes applying a substantially continuous coating of pyrolitic carbon on each of said individual carbon fibers and exposing the resulting pyrolitic carbon coated fibers to air before said forming.

5. A method of claim 1 including contacting said metal carbide matrix with molten silicon, and permitting said molten silicon to diffuse into said metal carbide matrix and substantially not into said carbon fiber-carbon matrix composite reinforcements.

6. A method of claim 1 wherein said carbon fiber bundles are in the form of tows.

7. A method of claim 1 including contacting said metal carbide matrix with approximately an amount of molten silicon that will diffuse into said metal carbide matrix, and allowing approximately all of said silicon to diffuse into said metal carbide matrix without diffusing substantially into said carbon fiber-carbon matrix composite reinforcements.

8. A method of claim 1 wherein said letting includes providing no more than approximately 25 volume percent more of said molten infiltrant than the volume of said voids.

9. A method of claim 1 wherein said placing includes placing said open porous carbon fiber-carbon matrix preform in contact with molten zirconium, hafnium, tantalum, mixtures, or alloys thereof.

10. A method of claim 1 including selecting said infiltrant from alloys of said molten infiltrants.

11. A method of claim 1 wherein said placing includes placing approximately an amount of metal that will react with said sacrificial carbon in said open porous carbon-fiber-carbon matrix preform, and said letting includes allowing said sacrificial carbon to react with approximately all of said metal, and contacting said metal carbide matrix with approximately an amount of molten silicon that will diffuse into said metal carbide matrix, and allowing approximately all of said silicon to diffuse into said metal carbide matrix.

12. A method of claim 11 wherein said contacting includes contacting said metal carbide matrix with an amount of molten silicon that is more than an amount of silicon that will diffuse into said metal carbide matrix.

13. A method of claim 1 wherein said placing includes placing a stoichiometric excess of metal in contact with said open porous carbon-fiber-carbon matrix preform, and said letting includes allowing said sacrificial carbon to react with said metal, and contacting said metal carbide matrix with approximately an amount of molten silicon that will diffuse completely into said metal carbide matrix.

* * * * *